US008681205B2

(12) United States Patent
Pai et al.

(10) Patent No.: US 8,681,205 B2
(45) Date of Patent: Mar. 25, 2014

(54) SYSTEMS AND METHODS FOR CONTROLLING A THREE DIMENSIONAL (3D) COMPATIBLE VIEWING DEVICE

(75) Inventors: Iming Pai, San Jose, CA (US); Jinming Gu, Cupertino, CA (US); Xinwei Yang, Pleasanton, CA (US)

(73) Assignee: Via Technologies, Inc., New Taipei (TW)

( * ) Notice: Subject to any disclaimer, the term of this patent is extended or adjusted under 35 U.S.C. 154(b) by 190 days.

(21) Appl. No.: 13/086,056

(22) Filed: Apr. 13, 2011

(65) Prior Publication Data

US 2011/0310223 A1 Dec. 22, 2011

Related U.S. Application Data

(60) Provisional application No. 61/356,528, filed on Jun. 18, 2010.

(51) Int. Cl.
*H04N 15/00* (2006.01)
*H04N 13/04* (2006.01)
*G06T 15/00* (2011.01)

(52) U.S. Cl.
USPC .......... 348/43; 348/51; 348/56; 345/419

(58) Field of Classification Search
USPC .............. 348/43, 56, 51; 345/419
See application file for complete search history.

(56) References Cited

U.S. PATENT DOCUMENTS

| 8,289,379 | B2* | 10/2012 | Takahashi et al. | 348/51 |
| 2010/0039504 | A1* | 2/2010 | Takahashi et al. | 348/54 |
| 2010/0194857 | A1* | 8/2010 | Mentz et al. | 348/43 |
| 2010/0289873 | A1* | 11/2010 | Miyauchi et al. | 348/43 |
| 2011/0199466 | A1* | 8/2011 | Kim et al. | 348/55 |

FOREIGN PATENT DOCUMENTS

CN 1060004 A 4/1992

OTHER PUBLICATIONS

English translation of abstract of 1060004A (published Apr. 1, 1992).

* cited by examiner

*Primary Examiner* — Dave Czekaj
*Assistant Examiner* — Tsion B Owens
(74) *Attorney, Agent, or Firm* — McClure, Qualey & Rodack, LLP

(57) ABSTRACT

An interface unit is described that comprises a buffer for storing captured video data generated by a three dimensional (3D) device intended for a 3D monitor. The interface unit further comprises a synchronization signal extractor configured to extract vertical synchronization (vsync) signals from the video data and a control signal unit configured to derive control signals for a viewing device based on the stored vsync signals. The interface unit transmits the control signals to the viewing device.

21 Claims, 6 Drawing Sheets

SYSTEMS AND METHODS FOR CONTROLLING A THREE DIMENSIONAL (3D) COMPATIBLE VIEWING DEVICE

CROSS-REFERENCE TO RELATED APPLICATION

This application claims priority to, and the benefit of, U.S. Provisional Patent Application entitled, "Device to Control 3D Goggle," having Ser. No. 61/356,528, filed on Jun. 18, 2010, which is incorporated by reference in its entirety.

TECHNICAL FIELD

The present disclosure generally relates to video playback systems and particularly, to systems and methods for extracting three dimensional information from signals.

BACKGROUND

Three dimensional (3D) video systems are designed to duplicate real-world experience by providing each eye with a unique version of the video. By displaying a separate image for each eye, a 3D image is created, and objects in a 3D video may appear to be in front of or behind the screen. To view 3D video, the display technology and the corresponding 3D glasses ensure that the left eye sees only the video meant for the left eye, and so on for the right eye. There are a number of different technologies that are designed to accomplish this, and each technology has its own benefits, drawbacks and costs. As 3D video gains increasing popularity, more systems are becoming available to consumers for experiencing 3D effects.

Currently, 3D devices typically require viewers to wear goggles compatible with the system in order to experience the stereo video effect. The 3D devices produce control signals for the goggles to enable or disable the view of left eye goggle and right eye goggle in an interleaving fashion. The goggle must be in sync with the 3D monitor display sequence such that the left eye only views frames intended for the left eye and the right eye only views frames intended for the right eye. One perceived shortcoming is that the goggles used in such systems are generally proprietary goggles that must be compatible with the video playback system generating the 3D content.

SUMMARY

In one embodiment, a method implemented in an interface unit, comprises capturing, by the interface unit, video data generated by a three dimensional (3D) device intended for an output device and storing the video data in a buffer. The method further comprises extracting vertical synchronization (vsync) signals from the captured video data and generating control signals according to the vsync signals. The method further comprises transmitting the controls signals to a viewing device for viewing 3D content on the viewing device, the viewing device operating based on the control signals.

In another embodiment, an interface unit comprises a buffer for storing captured video data generated by a three dimensional (3D) device intended for a 3D monitor. The interface unit further comprises a synchronization signal extractor configured to extract vertical synchronization (vsync) signals from the video data and a control signal unit configured to derive control signals for a viewing device based on the stored vsync signals. The interface unit transmits the control signals to the viewing device.

In another embodiment, a method implemented in an interface unit comprises capturing, by the interface unit, video data generated by a three dimensional (3D) device intended for an output device and storing the captured video data in a buffer and extracting synchronization (sync) signals from the captured video data. The method further comprises associating timing of a first subset of the sync signals with left eye frames in the video data and associating with a remaining subset of the sync signals with right eye frames, wherein sync signals in the first subset and the remaining subset alternate. The method further comprises generating control signals according to the timing derived for left eye frames and right eye frames and transmitting the controls signals to a viewing device configured to view 3D content using the viewing device, the viewing device operating based on the control signals.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
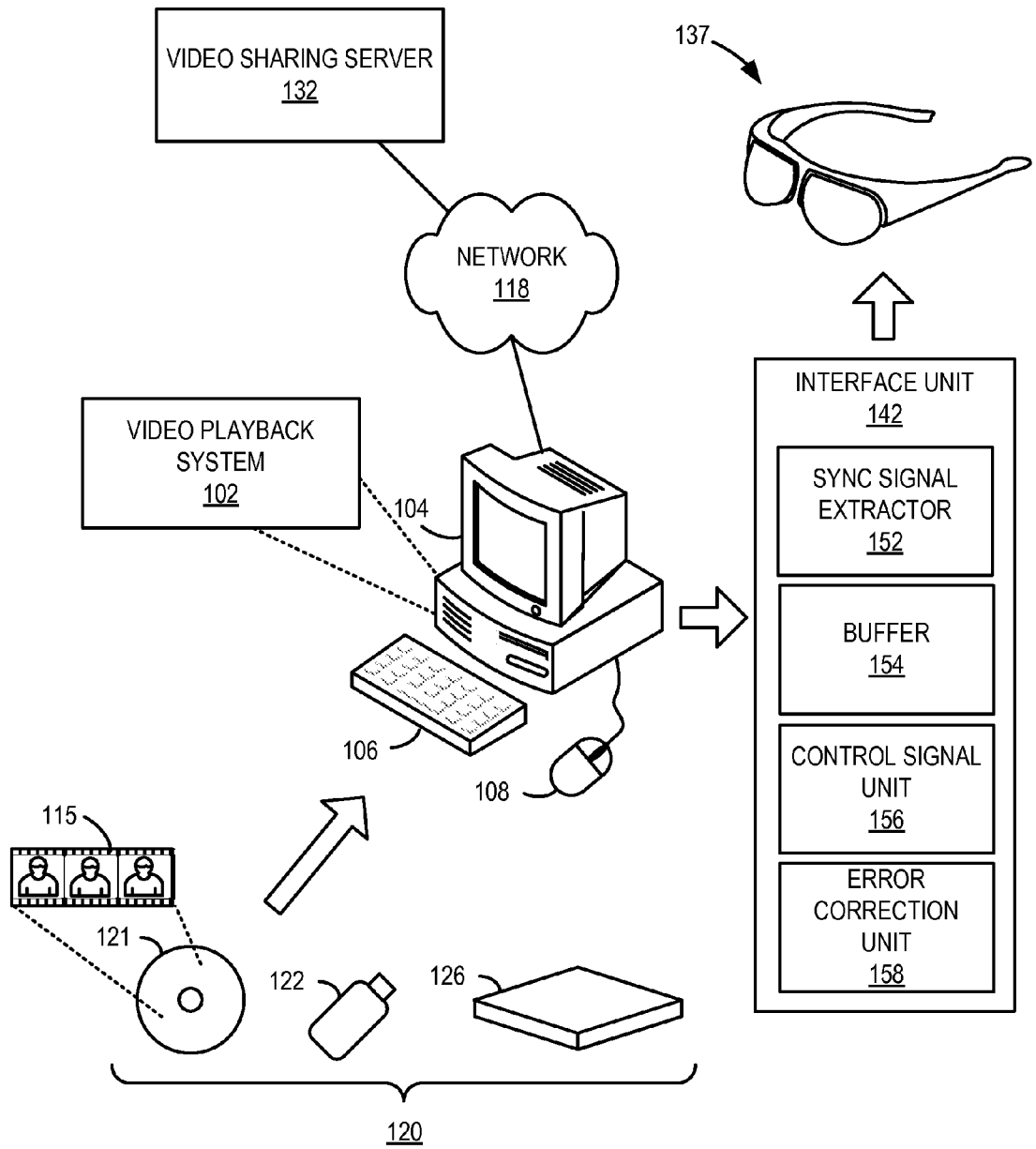
FIG. 1 depicts a system in which methods for deriving control information for a viewing device are implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, three dimensional (3D) devices such as video playback systems typically require viewers to wear goggles compatible with the systems in order to view 3D content and experience the stereo video effect. The 3D devices produce control signals for the goggles to enable or disable the view of left eye goggle and right eye goggle in an interleaving fashion. The goggle must be in sync with 3D monitor display sequence in timing where the left eye only watches the left eye frames and the right eye only watches the right eye frames. A perceived shortcoming is that the goggles used in such systems are generally proprietary goggles that must be compatible with the video playback system generating the 3D content.

Various embodiments are described for capturing video data from 3D video playback systems and generating control data for goggles. Through the various systems and methods described, the goggles and the associated interface unit work in conjunction with any player and 3D monitor combination, whereby the goggles to not have to be provided by a specific manufacturer. In accordance with some embodiments, an interface control unit is coupled between the video playback system and the output device (e.g., a 3D compatible television) to capture the video data, whereby the interface unit captures video data generated by a 3D device intended for the output device. The captured video data is stored in a buffer. Synchronization (sync) signals such as vsync or hsync signals are extracted from the captured video data.

The timing corresponding to alternating sync signals are associated with left eye frames, while the timing corresponding to the other sync signals are associated with right eye frames. Control signals are generated according to the timing derived for left eye frames and right eye frames and the video data and the controls signals are transmitted by the interface unit to a viewing device configured to view video content via the viewing device, where the viewing device comprises, for example, 3D-compatible goggles.

In accordance with another embodiment, a method implemented in an interface unit comprises capturing, by the interface unit, video data generated by a 3D device intended for an output device and storing the captured video data in a buffer and extracting synchronization (sync) signals from the captured video data. The method further comprises associating timing of a first subset of the sync signals with left eye frames in the video data and associating with a remaining subset of the sync signals with right eye frames, wherein sync signals in the first subset and the remaining subset alternate. The method further comprises generating control signals according to the timing derived for left eye frames and right eye frames and transmitting the controls signals to a viewing device configured to view 3D content using the viewing device, the viewing device operating based on the control signals. It should be emphasized that by implementing the various systems and methods described herein, proprietary goggles are no longer required for viewing the 3D content generated by a video playback system.

Reference is made to FIG. 1, which depicts a system in which methods for deriving control information for a viewing device are implemented. A video playback system 102 performs playback of 3D video content 115. The video playback system 102 that may be embodied, for example, as a desktop computer, computer workstation, laptop, or other computing platform and includes a display interface and input devices such as a keyboard 106 and a mouse 108. The video playback system 102 is coupled to an interface unit 142 configured to extract video data sent from the video playback system 102 to a display 104. For some embodiments, the interface unit 142 comprises a sync signal extractor 152, a buffer 154, a control signal unit 156, and an error correction unit 158. The synch signal extractor 152 is configured to extract sync signals such as vsync signals from the captured video data, and the buffer 154 stores captured video data. The control signal unit 156 is configured to derive control signals for a viewing device 137 based on the stored vsync signals, and the interface unit 142 transmits the control signals to the viewing device 137 (e.g., 3D goggles).

Figure 4A:
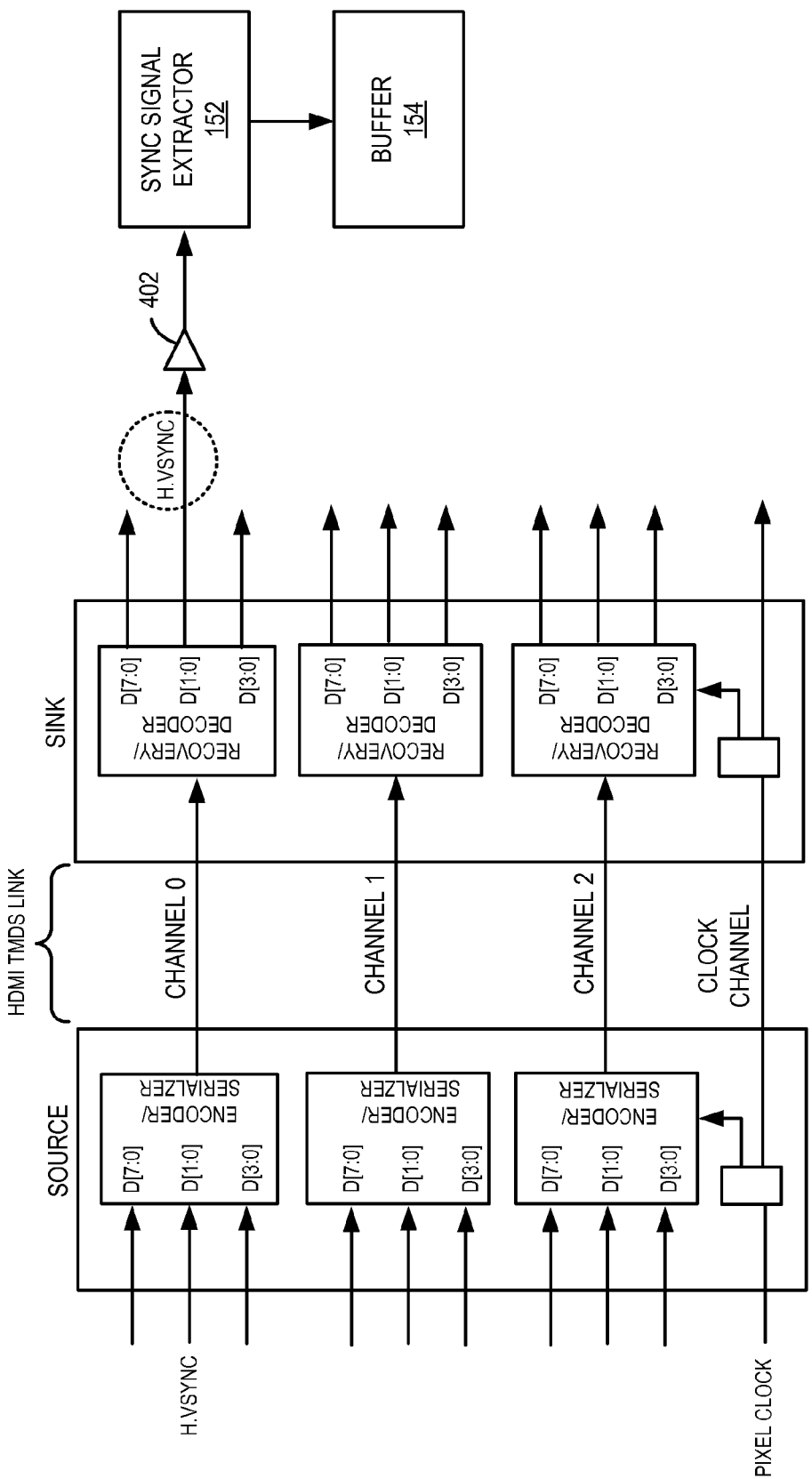
FIG. 4A illustrates TMDS (transition minimized differential signaling) on an HDMI interface.
Figure 4B:
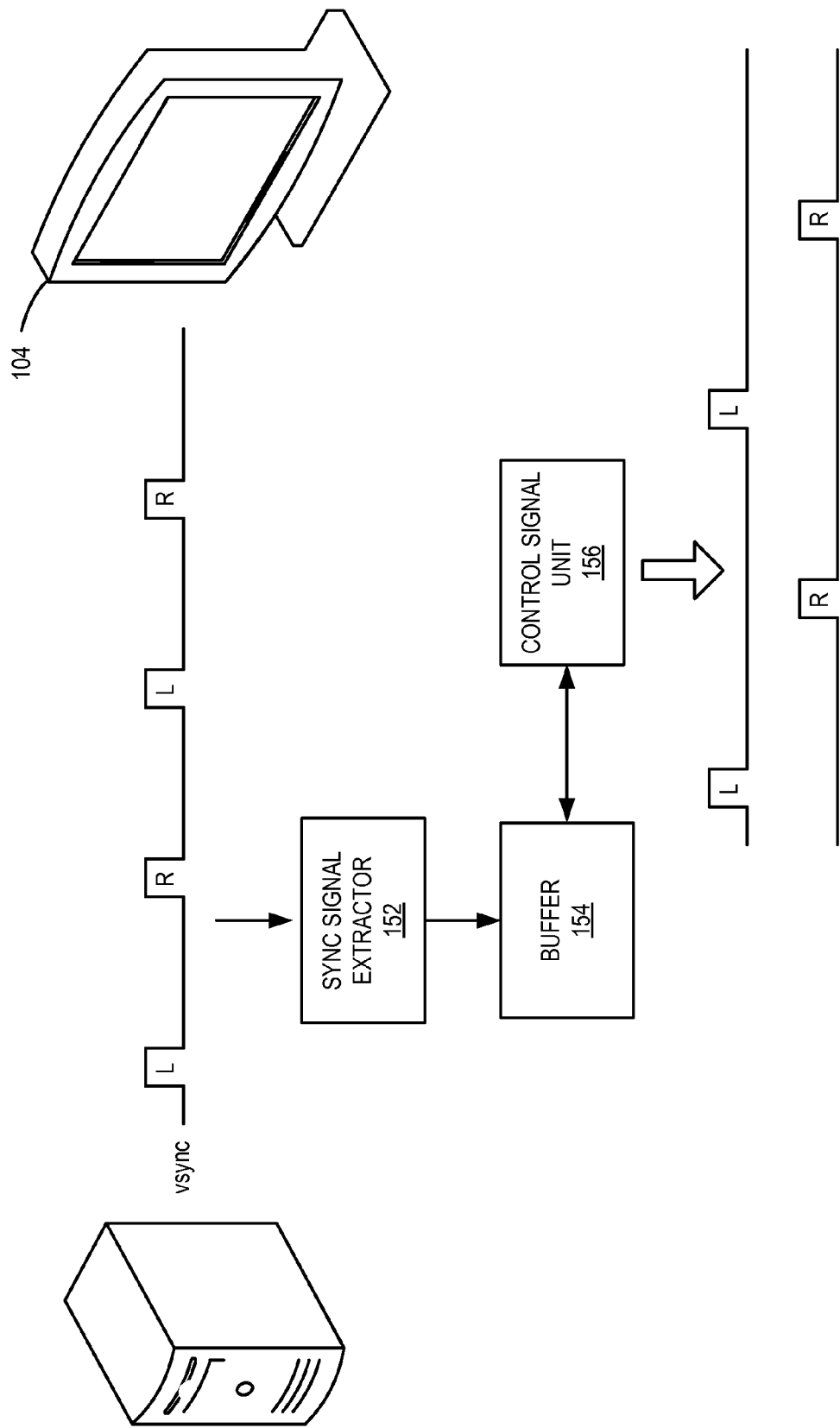
FIG. 4B illustrates the derivation of timing information for left eye and right eye images.

The embodiment of the interface unit 142 in FIG. 1 further comprises an error correction unit 158 configured to receive error indicators from the viewing device 137, where the error correction unit 158 is configured to readjust the derived control signals according to the direction and frequency associated with the control signals, wherein the direction corresponds to association of alternating sync signals to left eye frames and right eye frames. To further illustrate, consider a scenario where the sync signal extractor 152 extracts sync information from a high definition multimedia interface (HDMI) interface through which the video playback system 102 is coupled to the display 104. Reference is made to FIG. 4B. In accordance with one embodiment, the sync signal extractor 152 extracts the first sync signal (for example, the first vsync pulse) that the sync signal extractor 152 observes on the HDMI interface.

The control signal unit 156 assigns that first captured sync signal to left eye frames. The sync signal extractor 152 then extracts the next sync signal, and the control signal unit 156 then assigns the second captured sync signal to right eye frames. The next sync signal observed on the HMDI interface is then again associated with left eye frames and so on in an alternating fashion such that a first subset of the sync signals is associated with left eye frames in the video data and the remaining subset of the sync signals are associated with right eye frames, wherein sync signals in the first subset and the remaining subset occur in an alternating fashion. In the event that a viewing error occurs at the viewing device 137 (e.g., the image on the display 104 is distorted), the viewing device 137 sends an error indicator to the error correction unit 158, which then switches the timing associated with the left eye frames and right eye frames. The error correction unit 158 may also adjust the frequency/timing associated with the left and right eye frames by predetermined increments.

Referring back to FIG. 1, the video playback system 102 is configured to receive video content 115 such as 3D video from various sources. For some implementations, the video content 115 is retrieved from a storage medium 120 such as, for example, a Blu-ray disc 121, a USB thumb drive 122, an external disc drive 126, or other tangible storage medium. As one of ordinary skill will appreciate, the video content 115 may be encoded in various formats. The video playback system 102 may support any one of a number of common computer interfaces, such as, but not limited to IEEE-1394 High Performance Serial Bus (Firewire), USB, a serial connection, and a parallel connection.

The video playback system 102 may also be coupled to a network 118, such as the Internet or a local area network (LAN). Through the network 118, the video playback system 102 may receive video content 115 from another video playback system (not shown) or a video sharing server 132. Utilizing the components described above, the video playback system 102 generates timing information for the viewing device 137 so that a user can view 3D content generated by the video playback system 102 on the display 104.

Figure 2:
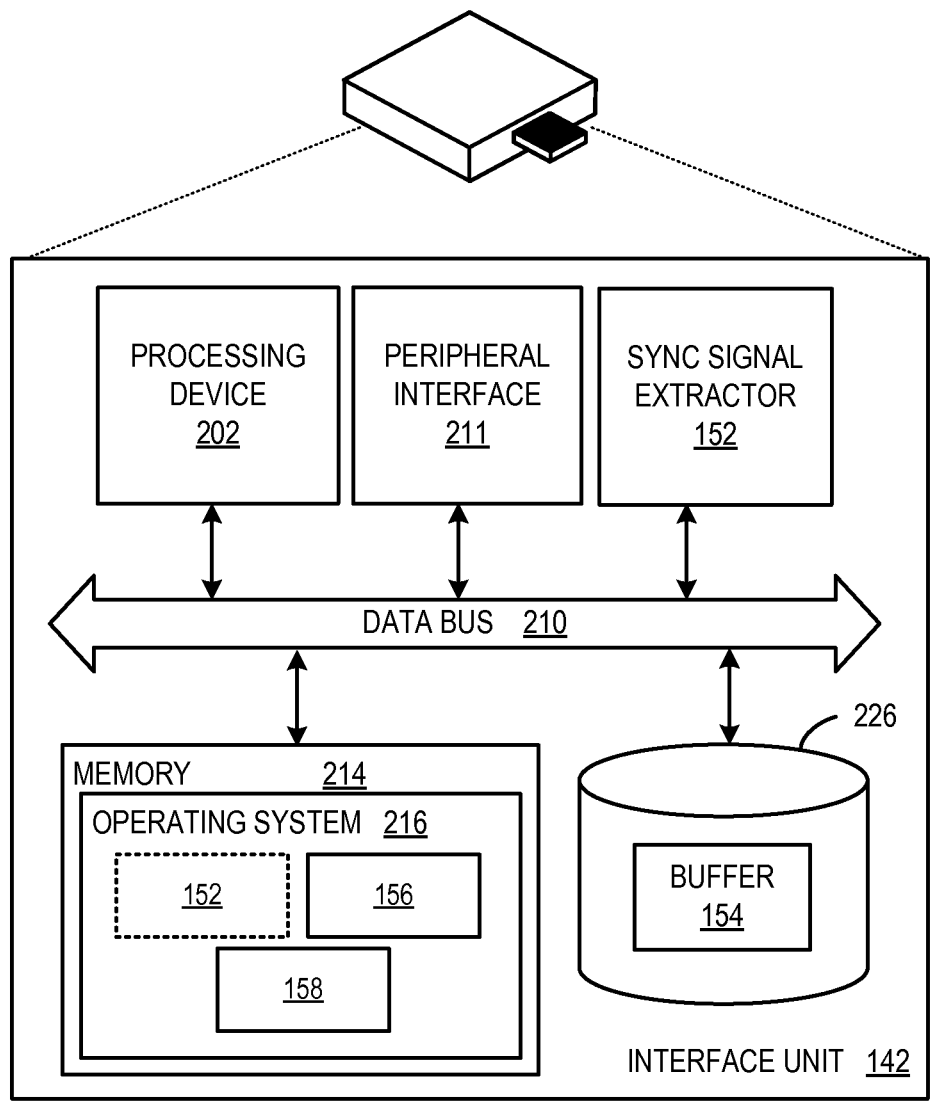
FIG. 2 illustrates an embodiment of the interface unit in FIG. 1.

FIG. 2 illustrates an embodiment of the interface unit 142 shown in FIG. 1. The interface unit 142 may be embodied in any one of a wide variety of wired and/or wireless computing devices, such as a desktop computer, portable computer, dedicated server computer, multiprocessor computing device, smartphone, personal digital assistant (PDA), digital camera, and so forth. As shown in FIG. 2, the interface unit 142 comprises memory 214, a processing device 202, a peripheral interface 211, and mass storage 226, wherein each of these devices are connected across a local data bus 210.

The processing device 202 may include any custom made or commercially available processor, a central processing unit (CPU) or an auxiliary processor among several processors associated with the interface unit 142, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the interface unit 142 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical). With further reference to FIG. 2, the sync signal extractor 152 depicted earlier in FIG. 1 may be embodied in hardware, software stored on a tangible storage medium executed by the processing device 202, or a combination of both.

Figure 3:
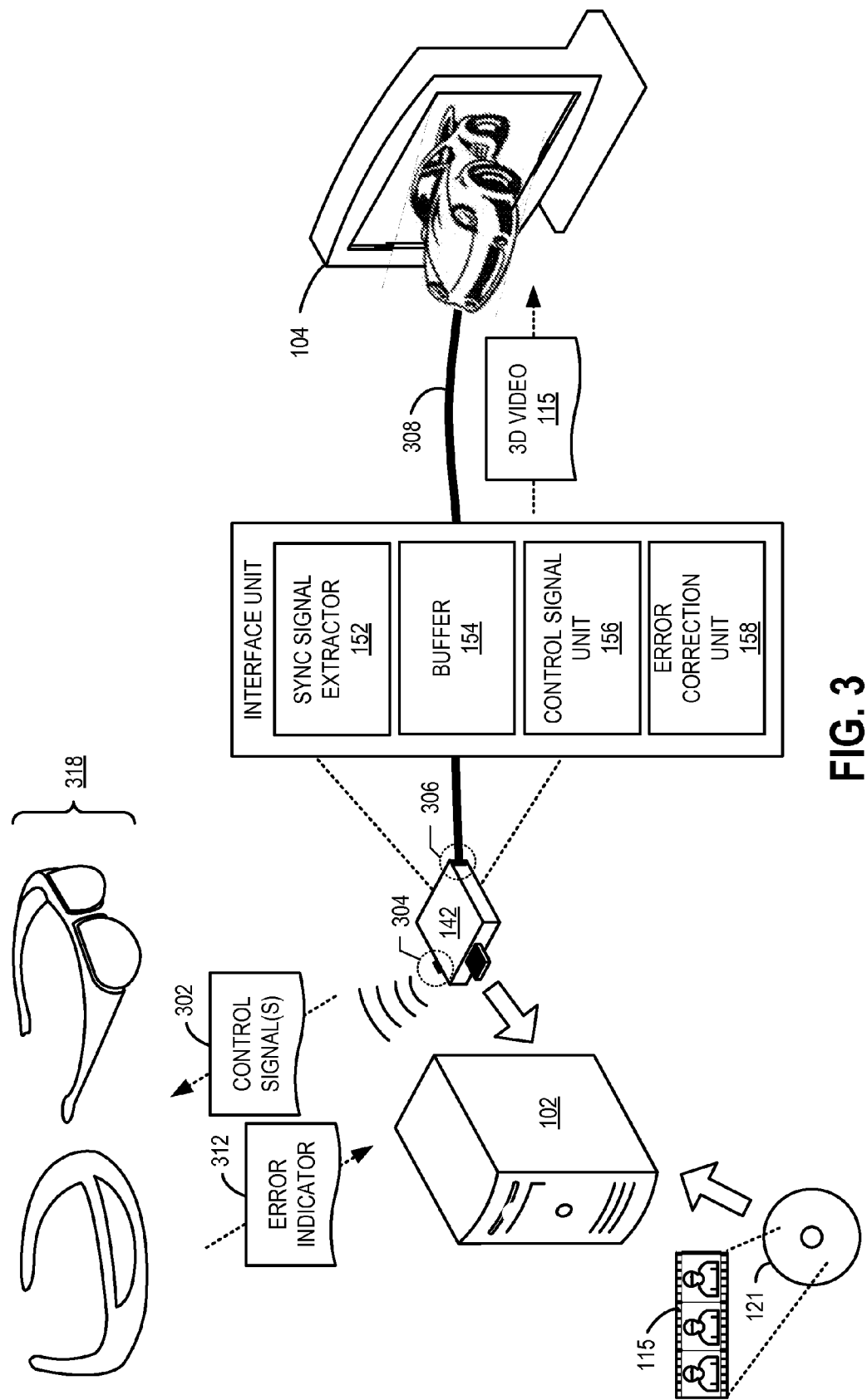
FIG. 3 illustrates operation of the interface unit in FIG. 1.

Reference is made to FIG. 3, which illustrates operation of the interface unit 142 in FIG. 1. As shown, a video playback system 102 receives 3D video content 115 stored on a tangible storage medium such as an optical disc 121. The video playback system 102 may comprise, for example, a desktop computer, a Blu-ray Disc player, etc. The video playback system 102 receives the video content 115 and sends the video content 115 to an output device 104 coupled to the video playback system 102 via a cable 308 (e.g., an HDMI cable). The interface unit 142 is attached to the video playback 102 via an interface port on the video playback system 102. The interface may comprise, for example, an HDMI interface, a digital visual interface (DVI), a displayport (DP) interface, an embedded displayport (eDP) interface, and a low-voltage differential signaling (LVDS) interface, among others. The interface unit 142 has a corresponding interface 306 that is coupled to the output device 104 via a cable 308 (e.g., an HDMI cable). Through the cable 308, the interface unit 142 sends the video content 115 received by the video playback system 102.

The interface unit 142 is further configured to extract synchronization information via the sync signal extractor 152. For example, when an HDMI interface is utilized to couple the output device 104 to the video playback system 102, the sync signal extractor 152 captures vsync signals according to the HDMI protocol. Referring briefly to FIG. 4A, the synch signal extractor 152 may, for example, extract vsynch (and/or hsync) signals on the TMDS (transition minimized differential signaling) interface, which carries audio/video data as well as auxiliary data. The sync signal extractor 152 may include a signal buffer 402 with high impedance inputs so that signal flow between the video playback system 102 and the output device 104 is not disrupted.

The data captured by the sync signal extractor 152 is temporarily stored in the buffer 154. As described earlier in connection with FIG. 4B, the control signal unit 156 derives control data according to the captured data, whereby the control data is used to operate a viewing device such as 3D goggles. Referring back to FIG. 3, various goggles 318 can be used in the system, whereby the goggles 318 are not tied to a particular proprietary 3D interface. The control signal unit 156 transmits control signals 302 to the goggles 318 via a wired or wireless interface 304. For example, a radio frequency (RF) interface, an infrared interface, or a universal serial bus (USB) interface may be utilized to transmit information to the goggles 318.

Most 3D output devices 104 such as a monitor or television operate in conjunction with active shutter goggles 318, which are made with LCD lenses that can block out light completely. The 3D compatible output device 104 typically displays the left and right eye images in an alternating fashion. A synchronization signal is sent to the active 3D goggles 318 to alternately close the opposite lens. The control signals 302 sent by the interface unit 142 are used to control the closing and opening of lens within the goggles 318.

As described earlier, the interface unit 142 further comprises an error correction unit 158 configured to receive error indicators 312 from the viewing device. If the control signals 302 sent to the goggles 318 provides incorrect timing such that video content 115 viewed using the goggles 318 is distorted, the user can press a button on the goggles 318 to indicate that an error has occurred. For some implementations, the goggles 318 send an error indicator 312 to indicate that the video content being viewed using the goggles 318 is distorted. The error indicator 312 is received by the error correction unit 158 which then adjusts the control signals 302. For some implementations, the error correction unit 158 switch the timing associated with left eye images with the timing associated with right eye images. In other instances, the error correction unit 158 may adjust the timing of the left and/or right images.

In accordance with alternative embodiments, the error correction may be performed locally at the goggles 318 rather than at the interface unit 142. For example, a user may activate a button on the goggles 318 to indicate that the video content 115 being viewed by the user is distorted. In response, the goggles 318 may be configured to switch the timing associated with left eye images with the timing associated with right eye images. In other instances, the goggle 318 may be configured to adjust the timing of the left and/or right images.

For some embodiments, the interface unit captures timing information via a channel separate from the channel used for transmitting image frames. In such cases, a video playback system 102 transmits timing information in a separate channel where the timing information is not embedded in the transmission signals (e.g., video signals). The interface unit 142 can thus be configured to extract timing information from a channel separate from the channel used by the video playback system 102 for transmitting video images to an output device 104.

Figure 5:
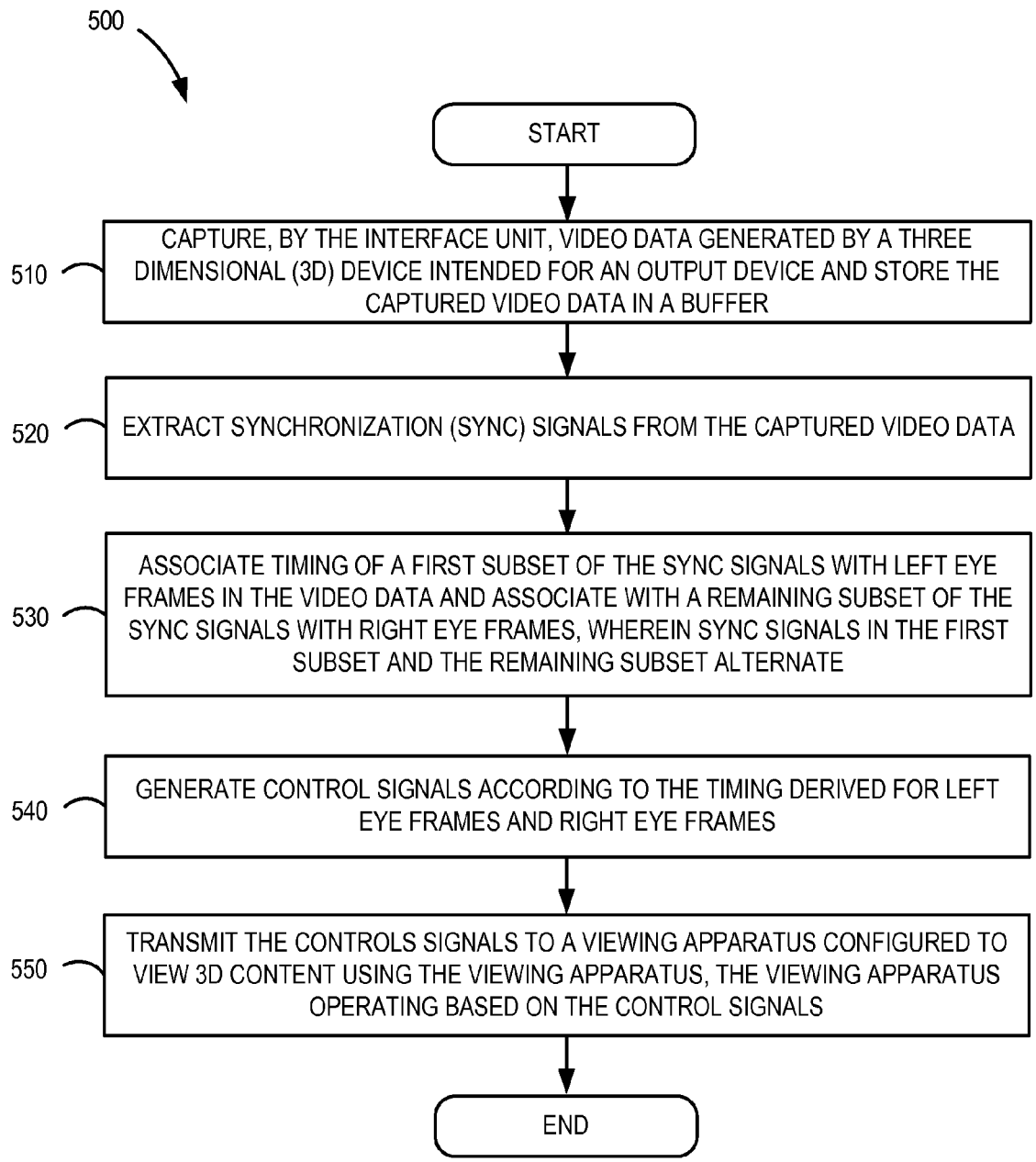
FIG. 5 is a flowchart for a method implemented in the interface unit depicted in FIGS. 1-3 for generating control signals used to operate a viewing device such as 3D compatible goggles.

Reference is now made to FIG. 5, which is a flowchart 500 for a method implemented in the interface unit 142 depicted in FIGS. 1-3 for generating control signals 302 used to operate a viewing device such as 3D compatible goggles 318. If embodied in software, each block depicted in FIG. 5 represents a module, segment, or portion of code that comprises program instructions stored on a non-transitory computer readable medium to implement the specified logical function (s). In this regard, the program instructions may be embodied in the form of source code that comprises statements written in a programming language or machine code that comprises numerical instructions recognizable by a suitable execution system such as a processing device 202 implemented in the interface unit 142 shown in FIG. 2. The machine code may be converted from the source code, etc. If embodied in hardware, each block may represent a circuit or a number of interconnected circuits to implement the specified logical function(s).

Although the flowchart 500 of FIG. 5 shows a specific order of execution, it is understood that the order of execution may differ from that which is depicted. Beginning in block 510, the interface unit 142 captures video data generated by a three dimensional (3D) device such as the video playback system 102 in FIG. 1, where the video data is intended for an output device 104. The interface unit 142 stores the captured video data in a buffer 154 (refer to FIG. 3). In block 520, the interface unit 142 extracts sync signals from the captured video data, and in block 530, timing corresponding to a first subset of the sync signals is associated with left eye frames in the video data. Similarly, timing corresponding to a remaining subset of the sync signals is associated with right eye frames. The sync signals in the first subset and the remaining subset interleave. For example, as described earlier in connection with FIG. 4B, the sync signal extractor 152 in FIG. 3 captures every other vsync pulse, and the control signal unit 156 derives timing information based on every other vsync pulse. This timing is associated with left eye images. The control signal unit 156 further derives timing information from the alternating vsync signals and associates the timing with right eye images.

Referring back to FIG. 5, in block 540, control signals 302 are generated according to the timing derived by the control signal unit 156 (in FIG. 3) for left eye frames and right eye frames. In block 550, the interface unit 142 transmits the controls signals to a viewing device configured to view 3D content using the viewing device, where the viewing device operates based on the control signals. For example, with reference back to FIG. 3, the controls signals 302 sent by the interface unit 142 are used by the goggles 318 to viewing the video content 115 shown on the output device 104 (e.g., a 3D-compatible monitor or television).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method implemented in an interface unit coupled between a three dimensional (3D) device and an output device, comprising:
    capturing, by the interface unit, video data generated by the 3D device to be displayed on the output device and storing the video data in a buffer;
    extracting, by the interface unit, vertical synchronization (vsync) signals from the captured video data;
    generating, by the interface unit, control signals according to the vsync signals; and
    transmitting, by the interface unit, the controls signals to a viewing device for viewing 3D content of the video data on the viewing device, the viewing device operating based on the control signals.

2. The method of claim 1, wherein the viewing device comprises 3D compatible goggles, the goggles being designed independently of the 3D device, the goggles being configured to send an error indicator to the 3D device to indicate that the 3D content is distorted.

3. The method of claim 1, wherein the 3D device is coupled to the interface unit via a high definition multimedia interface (HDMI) interface.

4. The method of claim 3, wherein capturing vsync signals comprises capturing vsync signals according to the HDMI protocol.

5. The method of claim 4, wherein the HDMI protocol comprises a transition minimized differential signaling (TMDS) based protocol.

6. The method of claim 1, wherein the 3D device is coupled to the interface unit via one of: a digital visual interface (DVI), a displayport (DP) interface, an embedded displayport (eDP) interface, and a low-voltage differential signaling (LVDS) interface.

7. The method of claim 1, further comprising:
    receiving, by the interface unit, an error indicator from the viewing device associated with the control signals transmitted to a viewing device; and
    responsive to the error indicator, adjusting the control signals to correctly display content on the viewing device.

8. The method of claim 7, wherein adjusting the control signals according to one of: a reverse direction and a frequency of the control signals.

9. The method of claim 1, wherein transmitting the controls signals to a viewing device is performed via one of:
    a radio frequency channel;
    an infrared channel; and
    a wired connection.

10. An interface unit coupled between a three dimensional (3D) device and a monitor, comprising:
    a buffer for storing captured video data generated by the 3D device to be displayed on the monitor for displaying 3D content;
    a synchronization signal extractor configured to extract vertical synchronization (vsync) signals from the video data;
    a control signal unit configured to derive control signals for a viewing device based on the stored vsync signals;
    wherein the interface unit transmits the control signals to the viewing device.

11. The interface unit of claim 10, wherein the video data comprises image frames.

12. The interface unit of claim 10, wherein the control signal unit derives control signals according to timing of the vsync signals.

13. The interface unit of claim 10, wherein the synchronization signal extractor is configured to extract vertical synchronization (vsync) signals by extracting left hand image sequences in the video data.

14. The interface unit of claim 13, wherein the control signal unit is configured to derive control signals based on the stored vsync signals by associating alternating vsync signals with left eye frames and associating the remaining vsync signals with right eye frames.

15. The interface unit of claim 14, further comprising an error correction unit configured to receive an error indication from the viewing device, the error correction module configured to adjust the derived control signals according to one of: direction and frequency associated with the control signals, wherein the direction corresponds to association of alternating vsync signals to left eye frames and right eye frames.

16. A method implemented in an interface unit coupled between a three dimensional (3D) device and an output device, comprising:

capturing, by the interface unit, video data generated by the 3D device to be displayed on an output device and storing the captured video data in a buffer;

extracting, by the interface unit, synchronization (sync) signals from the captured video data;

associating, by the interface unit, timing of a first subset of the sync signals with left eye frames in the video data and associating with a remaining subset of the sync signals with right eye frames, wherein sync signals in the first subset and the remaining subset alternate;

generating, by the interface unit, control signals according to the timing derived for left eye frames and right eye frames; and transmitting, by the interface unit, the controls signals to a viewing device configured to view 3D content of the video data using the viewing device, the viewing device operating based on the control signals.

17. The method of claim 16, wherein the viewing device comprises 3D compatible goggles, the goggles being designed independently of the 3D device, the goggles being configured to send an error indicator to the 3D device to indicate that the 3D content is distorted.

18. The method of claim 16, wherein the 3D device is coupled to the interface unit via one of: a digital visual interface (DVI), a displayport (DP) interface, an embedded displayport (eDP) interface, and a low-voltage differential signaling (LVDS) interface.

19. The method of claim 16, further comprising:

receiving an error indication from the viewing device; and responsive to receiving an error indication, reversing the timing previously associated with the left eye frames and right eye frames.

20. The method of claim 19, wherein receiving the error indication is performed via one of:

a radio frequency channel;

an infrared channel; and a wired connection.

21. The method of claim 16, wherein transmitting the controls signals to the viewing device is performed via one of:

a radio frequency channel;

an infrared channel; and a wired connection.

* * * * *